(12) United States Patent
Cope (10) Patent No.: US 7,083,229 B2
(45) Date of Patent: Aug. 1, 2006

(54) BICYCLE SEAT (76) Inventor: Janice Story Cope, P.O. Box 427, Barker, TX (US) 77413

( * ) Notice: Subject to any disclaimer, the term of this patent is extended or adjusted under 35 U.S.C. 154(b) by 0 days.

(21) Appl. No.: 11/130,691

(22) Filed: May 17, 2005

(65) Prior Publication Data

US 2005/0258675 A1    Nov. 24, 2005

Related U.S. Application Data (60) Provisional application No. 60/573,645, filed on May 21, 2004.

(51) Int. Cl.
B62J 1/00 (2006.01)

(52) U.S. Cl. .............. 297/195.1; 297/452.24; 297/202

(58) Field of Classification Search ............. 297/195.1, 297/202, 452.21, 452.25, 452.55, 452.24
See application file for complete search history.

(56) References Cited

U.S. PATENT DOCUMENTS

| | | | | |
|---|---|---|---|---|
| 3,503,649 A | * | 3/1970 | Johnson ............. | 297/452.26 |
| 4,572,575 A | * | 2/1986 | Golden et al. ....... | 297/195.1 |
| 4,773,705 A | * | 9/1988 | Terranova ........... | 297/215.14 |
| 5,011,222 A | * | 4/1991 | Yates et al. ......... | 297/215.1 |
| 5,397,161 A | * | 3/1995 | Huang ................ | 297/195.1 |
| 6,045,180 A | * | 4/2000 | Clutton .............. | 297/202 |
| 6,079,775 A | * | 6/2000 | Lawson .............. | 297/215.14 |
| 6,139,097 A | * | 10/2000 | Yates ................. | 297/195.1 |
| 6,672,660 B1 | * | 1/2004 | Hoshino ............. | 297/195.1 |
| 6,709,052 B1 | * | 3/2004 | Jalkanen ............ | 297/202 |

* cited by examiner

Primary Examiner—Peter R. Brown
(74) Attorney, Agent, or Firm—Harrison Law Office

(57) ABSTRACT

A bicycle seat design that comprises appropriately spaced and configured depressions that conform to the body of variously-sized male riders, thereby reducing pressure normally present on the lumbar back region, the ischial buttocks regions, and groin. Superior safety features provide comfort and support to vulnerable parts of the body. The preferred embodiment contains a round seating platform with raised rear and lateral edges and a left and right depression shaped to accommodate and support the buttocks. It also contains a depression in the central front area of the seating platform suitably shaped to accommodate and support the scrotal region, for preventing damage commonly associated with jarring or snagging the scrotum. Optionally, turning-signals, brake lights, and reflective lights positioned on the rear portion of the seating platform are included for enhancing visibility of the bicycle and for promoting safe operation thereof.

4 Claims, 7 Drawing Sheets

BICYCLE SEAT

RELATED APPLICATIONS

This application claims priority based upon Provisional U.S. Application Ser. No. 60/573,645 filed May 21, 2004.

TECHNICAL FIELD OF THE INVENTION

The present invention relates to bicycle seats, and, more particularly, relates to bicycle seat embodiments configured to accommodate each of the male and female anatomy for preventing injury attributable to protracted bicycle riding by reducing pressure that normally would be applied to a rider's spinal lumbar region, buttocks ischial bones, pubic bone, coccyx, and, if a male rider, also to his scrotal region.

BACKGROUND OF THE INVENTION

For many years, bicycles have provided an efficient medium for transportation, exercise, recreation, and competition. It is well known that the staggering variety of existing bicycle saddles and seats has failed to provide total comfort and safety for riders, especially during prolonged periods on the seat and through long term use of a bicycle throughout a rider's lifetime. A poorly designed bicycle seat can cause serious and permanent damage in both men and women, more commonly in men. Saddle pressure on the two pudendal nerves in the crotch can cause genital numbness in both sexes and, over time, a standard saddle can cause damage to the arteries that supply blood to the crotch area, thereby causing sexual dysfunction, especially in men. Additionally, constant repositioning on an uncomfortable seat, a protracted bumpy ride, and/or bicycle-fall can cause damage directly to a male rider's scrotum.

The majority of existing saddles are generally configured in a triangular shape, having a narrow rear section—that further narrows to form a frontal saddle horn extending between the rider's legs. This seat configuration provides little support for the buttocks and the ischial bones which compels the body's weight to be substantially supported by the pubic bone, coccyx, and ischia. This phenomenon, unfortunately, can cause severe discomfort and potential impotency. While some prior art bicycle seats have attempted to minimize pressure applied to the ischial bones and pubic bone, and to redistribute this pressure over a larger, less sensitive area, no existing prior art specifically conforms to the contours of the male anatomy, effectively distributing a rider's weight throughout the cushioned areas of his pelvis and buttocks while simultaneously enclosing the scrotal region for affording protection from damage. No prior art bicycle seat has been found that combines these safety and comfort features with the additional combination of turning signals, braking lights, and reflective lights.

In U.S. Pat. No. 4,218,090, Hoffacker et al. discloses a bicycle seat, focusing on the interaction between the body of the rider and the seat in an attempt to provide lasting comfort and fewer saddle sores. This was accomplished through the addition of two small regions of padding placed on the seat directly beneath the rider's ischial bones and included a small space between the regions to prevent the padding from bunching when compressed by the rider's buttocks. While such a seat may reduce pressure on the rider's ischial bones, it should be apparent to those skilled in the art that the presence of a saddle horn and the general shape of the seat can still apply uncomfortable pressure to the pubic bone, coccyx, and scrotum, thereby being likely to cause nerve and arterial damage leading to numbness and impotency.

In U.S. Pat. Nos. 5,340,192 and 5,524,961, Hsh and Howard, respectively, disclose bicycle seats similar in concept to Hoffacker's, seeking to reduce rider discomfort through the addition of padded material to seats possessing the standard shape. These seats also fail to address the possibility of uncomfortable pressure applied to the pubic bone, coccyx and scrotum and of nerve and arterial damage possibly leading to numbness and impotency.

In U.S. Pat. No. 6,079,775, Lawson discloses a bicycle seat with no saddle-horn that seeks to permit an even weight-distribution on a rider's ischial bones. The seat possesses a frontal edge that allows a rider's legs and scrotum to hang freely, unhindered by the seat, while supporting the buttocks and ischial regions on a wide rear platform containing small depressions molded to fit the buttocks. Lawson also focuses on the position of the seat relative to a bicycle's handlebars and pedals. While this seat may reduce pressure on a rider's ischial bones and scrotum, it should be apparent that the frontal edge can apply uncomfortable pressure to the pubic bone of a rider and may cause nerve or arterial damage often associated with bicycle seats. Additionally, its molded depressions are shallow and may not effectively remove all uncomfortable pressure from a rider's ischial regions. Furthermore, the Lawson seat does not appear to protect against the possibility of scrotum injury through an impact or snag while freely hanging from the seat.

Similarly, in U.S. Pat. No. 5,938,278, Langevin discloses a bicycle seat with no saddle-horn, but possessing lateral plates to prevent sliding and support a rider's hips. These lateral plates are intended to allow a rider to control and orient a bicycle as a substitute for the control normally enabled by a saddle-horn. It should be apparent to one skilled in the art, however, that such a seat does little to reduce pressure on the ischial bones and that the front edge of the seat may apply uncomfortable pressure to a rider's pubic bone, coccyx, and scrotum, possibly causing nerve or arterial damage leading to numbness and impotency.

In U.S. Pat. No. 6,113,184, Barnes discloses a bicycle seat possessing the standard shape in all respects except for the absence of a traditional saddle horn. The seat possesses two frontal projections with a central space, allowing a male rider's scrotum to hang freely, unfettered by the seat. While this seat may reduce uncomfortable pressure to a male rider's scrotal region, it should be apparent to one skilled in the art that its frontal projections and the front portion of the seat can apply pressure to the pubic bone and coccyx, thereby damaging nerves and arteries in the same fashion as many other bicycle seats. Additionally, the seat does little to reduce discomfort due to pressure on a rider's ischial bones. It should be apparent to one skilled in the art that allowing the scrotum to hang between the frontal projections of a seat increases the possibility of injury thereto through unintentional contact with the seat, catching the scrotum on the seat, and/or a fall.

In U.S. Pat. No. 6,302,480 B1, Hall discloses a similar bicycle seat that lacks a saddle-horn and possesses a narrow center region to minimize contact between the seat and the central seating area of a rider's body. While this seat may reduce contact and pressure on a rider's pubic bone and coccyx, some contact between these regions and the seat still exists, thereby effectuating the potential for nerve and arterial damage. Additionally, it should be apparent to one skilled in the art that such a seat does not effectively remove all uncomfortable pressure from the ischial regions and does not adequately protect the scrotal region.

In U.S. Pat. No. 6,074,002, Hansen discloses a bicycle seat consisting of a central support member and two side cushions positioned in a V-shape configuration to provide comfort and stability to a rider. Such a seat, lacking a saddle-horn, minimizes contact between a rider's pubic bone and coccyx and the seat. It attempts to reduce discomfort to the ischial region through use of padded cushions. However, it should be apparent to one skilled in the art that the seat fails to reduce direct uncomfortable pressure away from a rider's ischial bones, and that such a seat provides little protection against the unintentional jarring or impacting of a male rider's scrotum.

Thus, no bicycle seat in the prior art effectively and simultaneously reduces uncomfortable pressure from the lumbar region of the spine, the ischial bones, the pubic bone, and the coccyx, thereby preventing nerve, arterial, and scrotal damage and the possibility of genital numbness and impotence—while comfortably and safely redistributing the pressure to other areas of a rider's body particularly preventing the possibility of damage to a male rider's scrotal region.

SUMMARY OF THE INVENTION

The present invention teaches a bicycle seat adapted to reduce pressure normally applied to a rider's spinal lumbar region, buttocks ischial bones, pubic bone, coccyx, and scrotal region; it simultaneously redistributes this pressure comfortably and safely across a rider's muscular buttocks and thighs. It will be appreciated that the structure of the present invention affords total hip coverage, by providing complete lumbar support and total comfort while enabling a bicycle to be safely and effectively operated. It will also be appreciated that the structures of the present invention enclose a male rider's scrotum while seated, thereby affording both support and protection thereto. In the preferred embodiment, a bicycle seat is provided having an appropriately-sized configuration including a broad, round platform with raised rear and lateral edges. The platform configurations taught by the present invention preferably contain two preferably broad depressions located beneath a male rider's ischial regions, and a third, smaller depression located in the front center portion of the platform beneath the scrotum.

It will be understood that the depressions taught by the present invention should be structured such that the pressure normally applied to a rider's ischial bones when seated will be distributed along the entirety of the buttocks and the upper portion of the thighs. In the preferred embodiment, the frontal depression should be configured such that minimal pressure is applied to a rider's scrotum, crotch area, and pubic bone. It will be appreciated that the rear and lateral edge of the seat platform should preferably be crafted such that a rider will remain stable while pedaling a bicycle, thereby enabling him to benefit from total hip support and suitable control bicycle orientation.

Preferred embodiments of the instant bicycle seat also contain reflective lights, turning signals, and/or brake lights disposed along the rear portion of the rear edge thereof. Battery packs disposed underneath the seat provide power to the lights and signals. As is well known in the art, switches to operate the lights and signals and sufficient wires or cables to interconnect the switches to the lights and signals should be included. It will be readily appreciated that an alternative embodiment of the bicycle seat may optionally contain solar cells sufficient in size and design to provide power to these lights and signals.

Embodiments of the bicycle seat of the present invention are contemplated to be manufactured in different sizes to fit any male rider, allowing all riders to achieve a comfortable position during prolonged riding periods. By-products of assuring riding comfort, of course, are not only enhancing his safety but also preventing injuries to him.

Accordingly, it is a feature of the present invention that the shape and configuration of the bicycle seat depressions and concomitant edge overcomes the limitations and disadvantages of the prior art.

It is an object of the present invention to provide a bicycle seat that minimizes rider discomfort and the consequent danger of physical damage attributable to protracted bicycle-riding.

It is another object of the present invention to provide a bicycle seat which has a configuration similar to the familiar conventional bicycle seat so that the seat is apt to be accepted by riders, and will be likely to be routinely used in the field.

It is still another object of the present invention to provide a bicycle seat that is sized and configured to accommodate a diversity of male riders' anatomies.

These and other objects and features of the present invention will become apparent from the following detailed description, wherein reference is made to the figures in the accompanying drawings.

DETAILED DESCRIPTION

Referring now to collectively to FIGS. 1–7, there may be seen bicycle seat 5 embodying the present invention. Bicycle seat 5 contains a preferably round seating platform 10, sloping lateral edges 15A and 15B and raised rear edge 15C, two concave depressions 20A and 20B located on the side regions of seating platform 10, concave depression 25 located in the front central region of seating platform 10, and a small ridge 30—approximately 0.25 inches in height—separating each of depressions 20A, 20B, and 25. Sloping lateral edges 15A and 15B have a gradual upwards slope, preferably beginning 0 inches in height at the front of seating platform 10 and sloping upwards to a height of 1.0 inches at the rear of seating platform 10, where they join raised rear edge 15C, which is elevated to a constant height of 1.0 inch. The position of the edges is such that a rider's hips are fully supported, thereby preventing lateral sliding during riding.

Depressions 20A and 20B are configured to conform to the contours of a male rider's buttocks and ischial bones, distributing a rider's weight evenly throughout the buttocks, reducing pressure on the ischial bones and lumbar region of the spine. Depression 25 is configured to contain and support a male rider's scrotum, removing pressure from the crotch area and eliminating the possibility of a scrotal injury caused by catching or snagging the scrotum on the bicycle seat or by unintentionally impacting the scrotum with the bicycle seat.

Now referring to FIGS. 8–14, there may be seen a perspective view of bicycle seat 50 embodying the concept of the present invention. Bicycle seat 50 contains preferably round seating platform 10, sloping lateral edges 15A and 15B and raised rear edge 15C, two concave depressions 55A and 55B located on side regions of seating platform 10, and small ridge 30—approximately 0.25 inches in height—separating each of depressions 55A and 55B. Depressions 55A and 55B are configured to conform to the contours of a female rider's buttocks and ischial bones, distributing her weight evenly throughout the buttocks, reducing pressure on the ischial bones and lumbar region of the spine.

Figure 18:
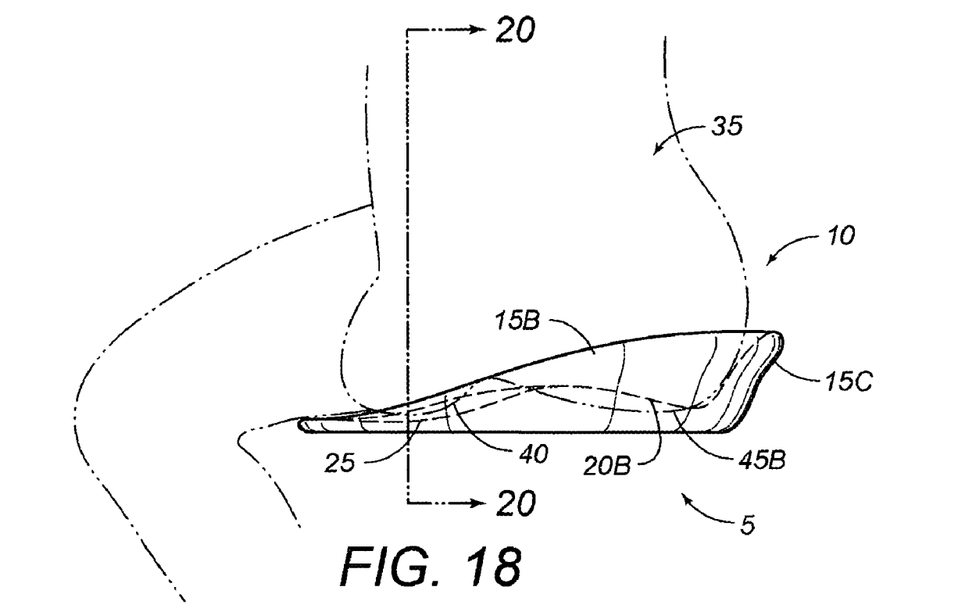
FIG. 18 is a side view of the bicycle seat depicted in FIG. 1, depicting the interaction of the embodied invention with the male anatomy.
Figure 20:
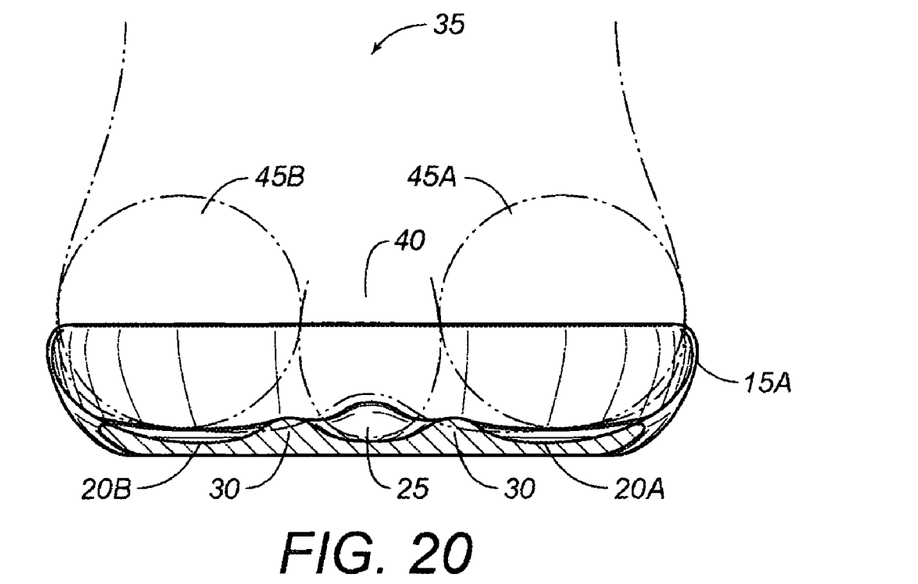
FIG. 20 is a rear cross-sectional view of the bicycle seat depicted in FIG. 2 along line 7—7, depicting the interaction of the embodied invention with the male anatomy.

Referring now to FIGS. 18 and 20, a rear cross-sectional view of bicycle seat 5 depicting the configuration of depressions 20A, 20B, and 25 interacting with male rider's body 35 is shown. Each of male rider's buttocks 45A and 45B rests within concave depression 20A and 20B respectively, causing the pressure normally applied directly to a male rider's ischial bones to be distributed evenly across buttocks 45A and 45B. Male rider's scrotum 40 rests within depression 25 which fully contains scrotum 40, thereby preventing the application of pressure to crotch area 42 and protecting scrotum 40 from the possibility of injury normally present when a male rider's scrotum is not similarly contained.

Figure 19:
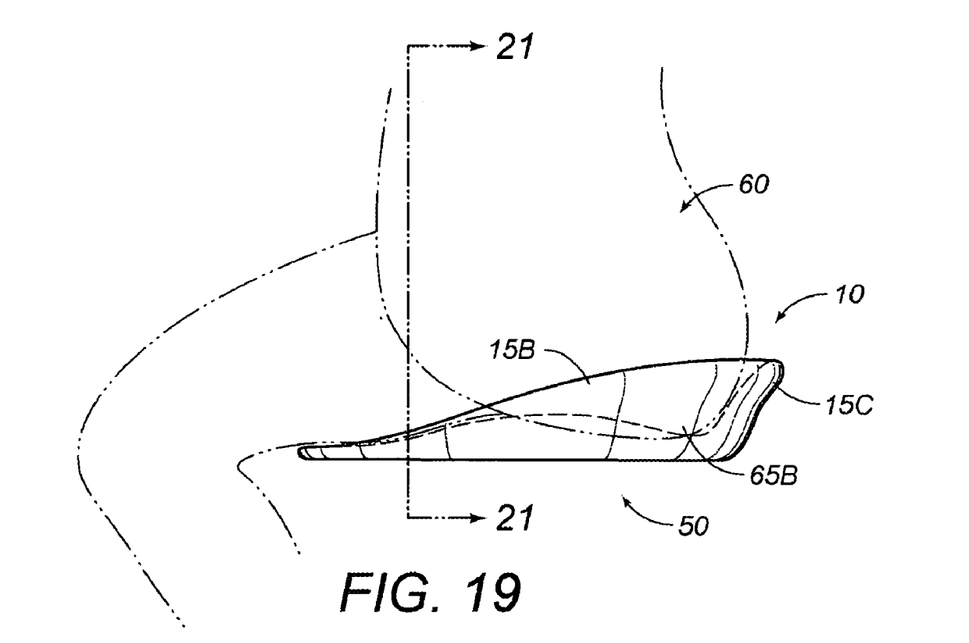
FIG. 19 is another side view of the bicycle seat depicted in FIG. 8, depicting the interaction of the embodied invention with the female anatomy.
Figure 21:
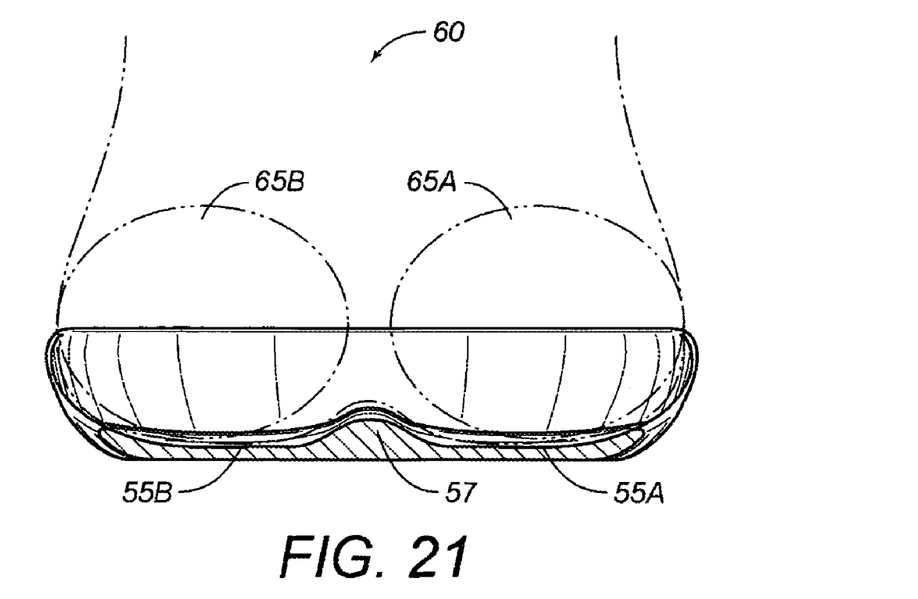
FIG. 21 is another rear cross-sectional view of the bicycle seat depicted in FIG. 9 along line 11—11, depicting the interaction of the embodied invention with the female anatomy.

Referring to FIGS. 19 and 21, a rear cross-sectional view of bicycle seat 50 depicting the configuration of depressions 55A and 55B interacting with a female rider's body 60 is shown. Each of female rider's buttocks 65A and 65B rests within concave depression 55A and 55B respectively, causing the pressure normally applied directly to a female rider's ischial bones to be distributed evenly across buttocks 65A and 65B.

As has been hereinbefore described, this configuration of depressions on a broad, round seating platform is contrary to the teaching of the prior art. Furthermore, it will be appreciated that the interaction of this configuration of depressions with the human body provides a unique advantage over the prior art which renders the preferred embodiment suitable to reduce uncomfortable and potentially harmful pressure normally present in the lumbar region of the spine, the ischial regions of the pelvis, and the pudendal nerves, and corresponding arteries in the crotch (and the scrotum for the male body, of course).

Figure 1:
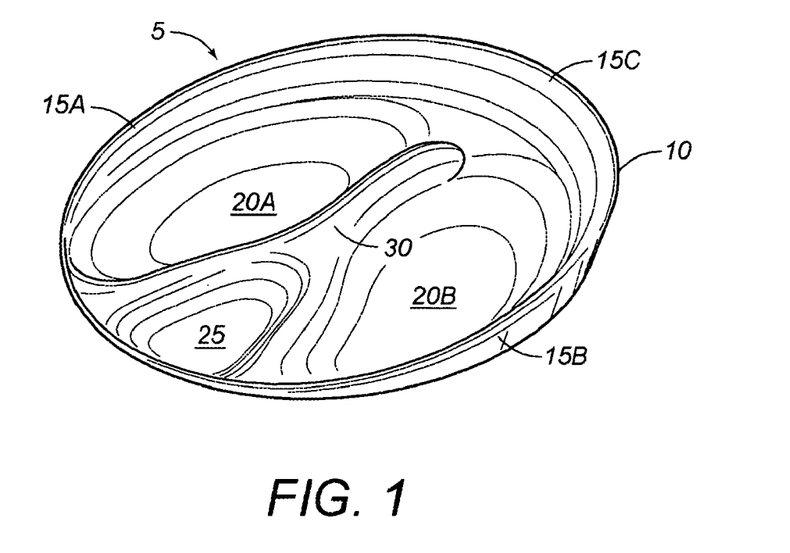
FIG. 1 is a perspective view of a bicycle seat including raised edges and depressions embodying the present invention.
Figure 2:
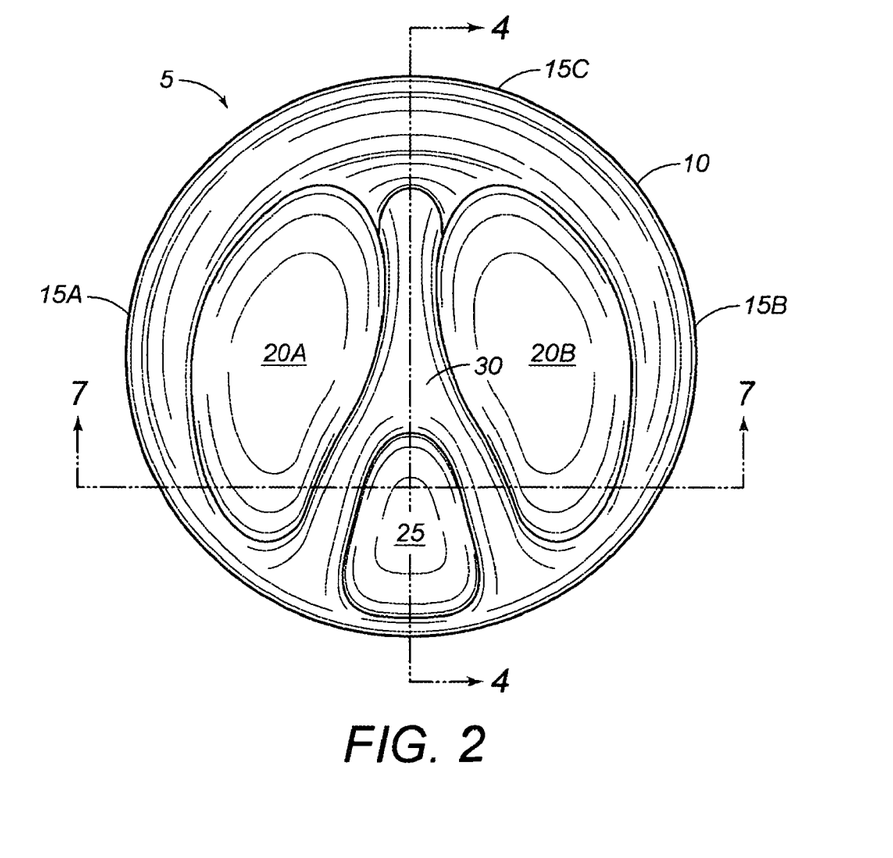
FIG. 2 is a top planar view of the bicycle seat depicted in FIG. 1.
Figure 3:
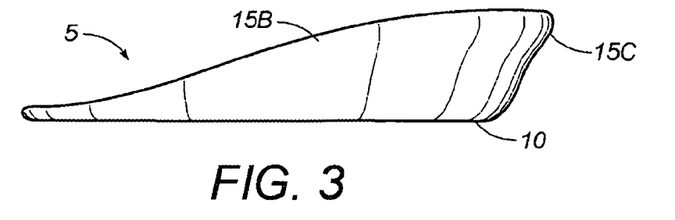
FIG. 3 is a side view of the bicycle seat depicted in FIG. 1.
Figure 4:
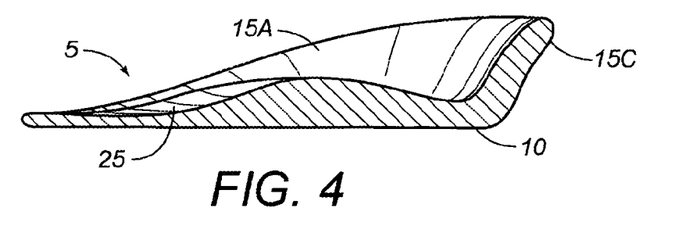
FIG. 4 is a side cross-sectional view of the bicycle seat depicted in FIG. 2 along line 4—4.
Figure 5:
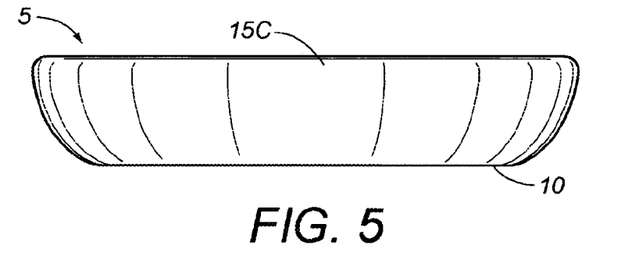
FIG. 5 is a rear view of the bicycle seat depicted in FIG. 1.
Figure 6:
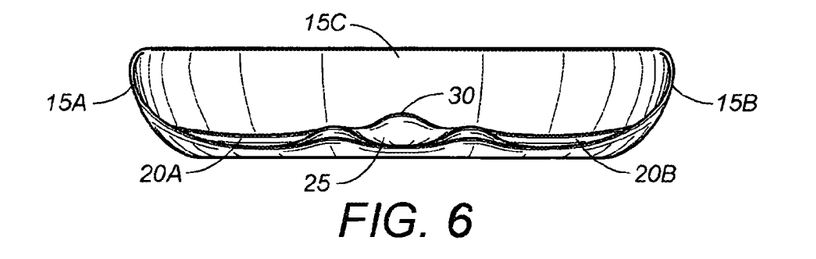
FIG. 6 is a frontal view of the bicycle seat depicted in FIG. 1.
Figure 7:
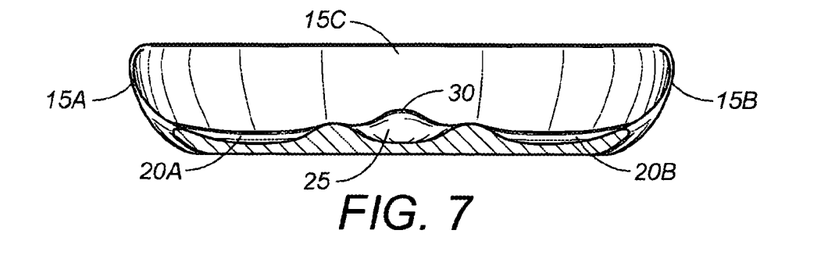
FIG. 7 is a frontal cross-sectional view of the bicycle seat depicted in FIG. 2 along line 7—7.
Figure 8:
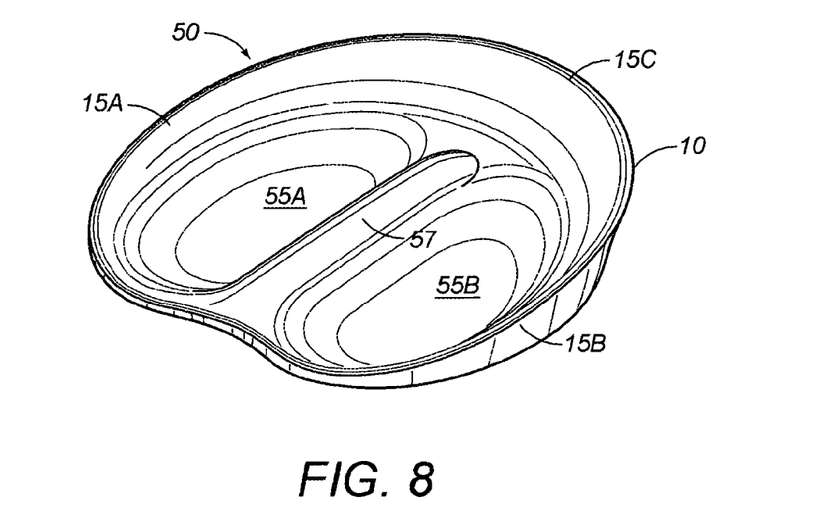
FIG. 8 is a perspective view of a bicycle seat including raised edges and depressions depicting a second embodiment of the present invention.
Figure 9:
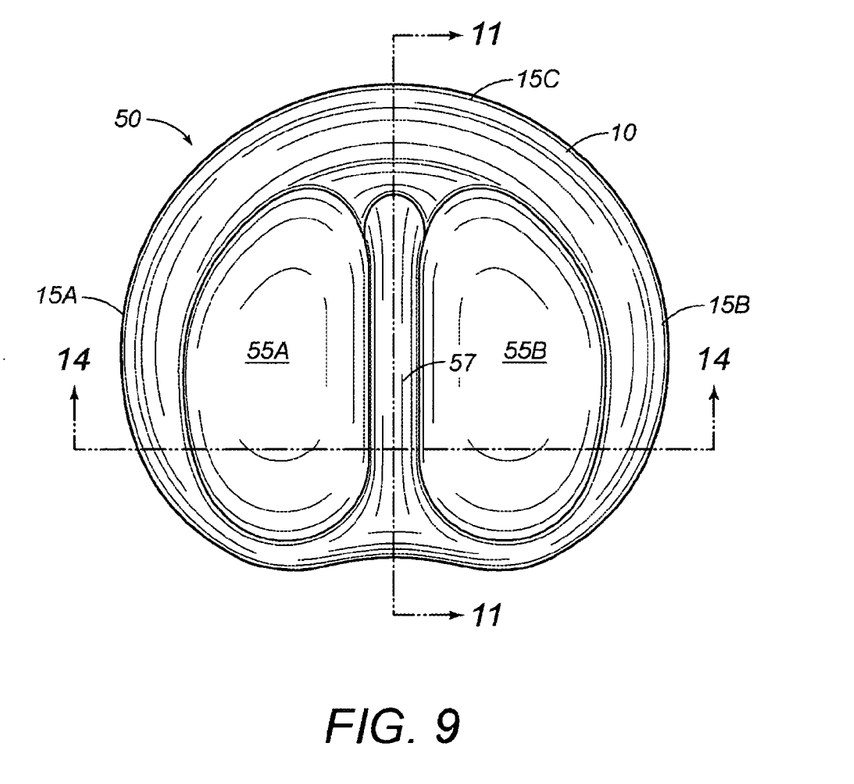
FIG. 9 is a top planar view of the bicycle seat depicted in FIG. 8.
Figure 10:
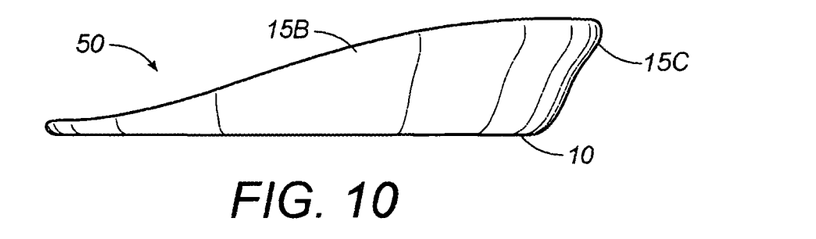
FIG. 10 is a side view of the bicycle seat depicted in FIG. 8.
Figure 11:
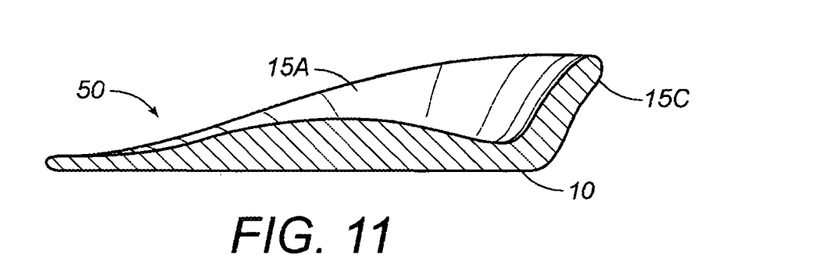
FIG. 11 is a side cross-sectional view of the bicycle seat depicted in FIG. 9 along line 11—11.
Figure 12:
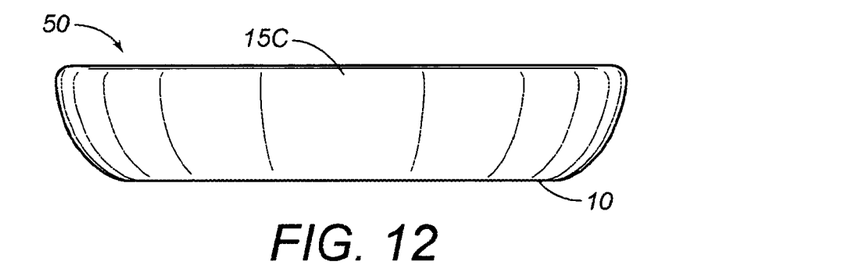
FIG. 12 is a rear view of the bicycle seat depicted in FIG. 8.
Figure 13:
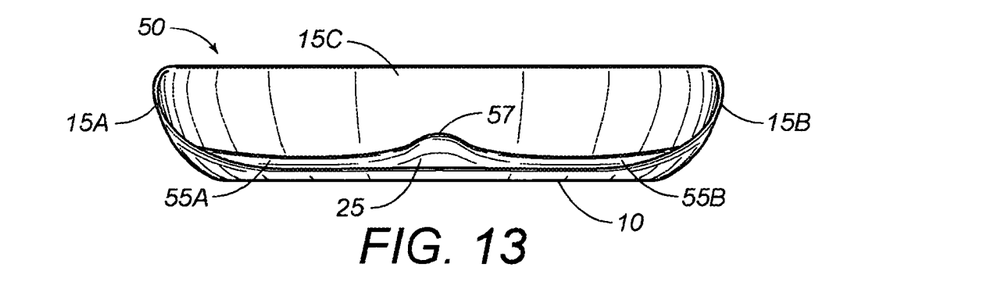
FIG. 13 is a frontal view of the bicycle seat depicted in FIG. 8.
Figure 14:
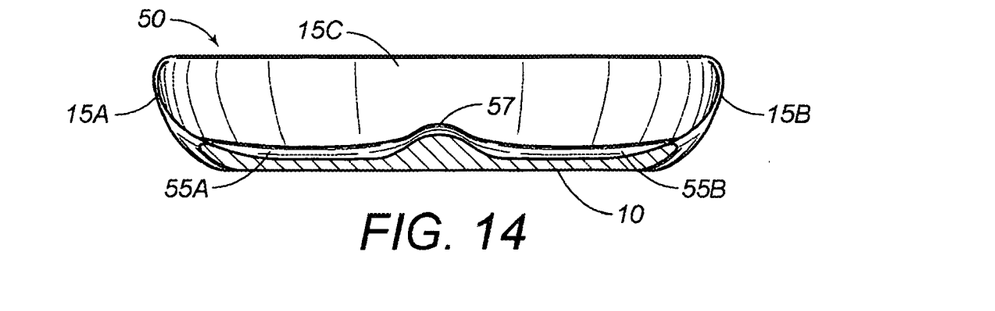
FIG. 14 is a frontal cross-sectional view of the bicycle seat depicted in FIG. 9 along line 14—14.
Figure 15:
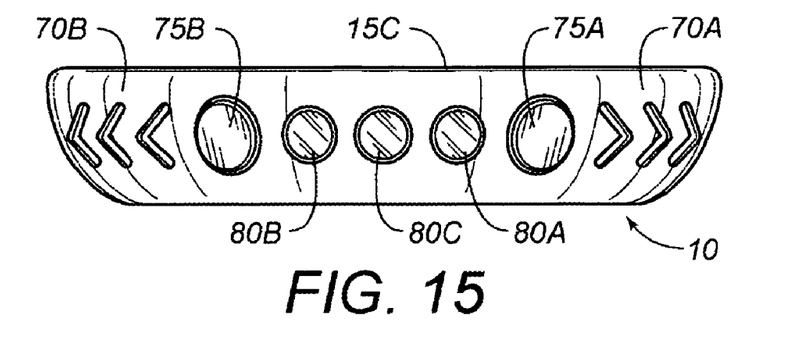
FIG. 15 is a rear view of the embodiment the bicycle seat depicted in FIG. 1 that includes lights, reflectors, and turn signals and embodies the present invention.
Figure 16:
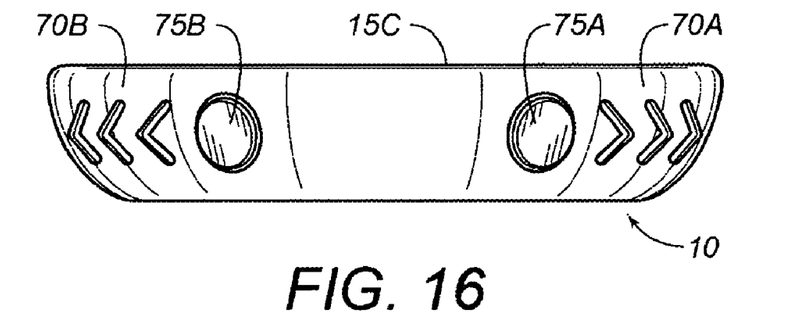
FIG. 16 is a rear view of another embodiment the bicycle seat depicted in FIG. 15.
Figure 17:
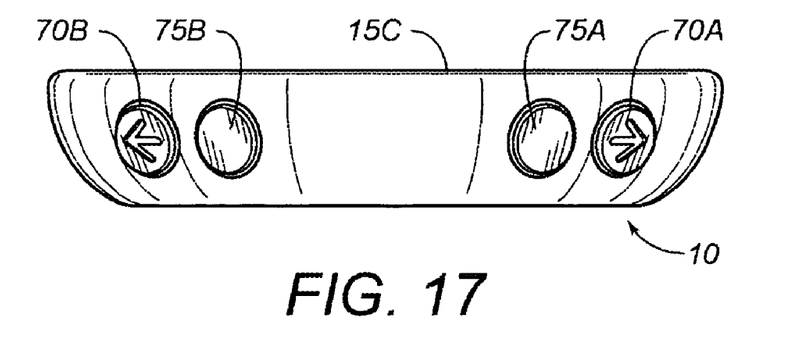
FIG. 17 is a rear view of another embodiment the bicycle seat depicted in FIGS. 15 and 16.

Now referring to FIGS. 15–17, rear views of seating platform 10 are depicted with alternative arrangements of turning signals, reflective lights, and brake lights disposed on the external rear wall thereof. For instance, in FIG. 16, turning signals 70A and 70B are located on either side of the rear of seating platform 10. Two brake lights 75A and 75B are located on either side of the rear of seating platform 10, adjacent turning signals 70A and 70B. Three reflective lights 80A, 80B, and 80C, illustrative of a plurality of such lights, are located in the center of the rear of seating platform 10. Brake lights 75A and 75B and turning signals 70A and 70B are powered by power source 85, disposed in compartment 90 to the underside of seating platform 10. Power source 85 includes a battery pack or solar cells and necessary switches, wires, and cables as is well known in the art. It should be evident to those skilled in the art that the simpler signal and light arrangements depicted in FIGS. 16 and 17 are subsets of the arrangement depicted in FIG. 15.

It will be appreciated by those skilled in the art that the present invention provides a bicycle seat comprising: a broad seating platform having rear and lateral edges configured to support the hips and lower back of a seated rider. Embodiments of this bicycle seat preferably have a seating platform that includes two appropriately-sized and configured depressions for containing a rider's buttocks. Embodiments intended for use by male riders preferably have a seating platform which includes an appropriately-sized and configured depression for containing the male rider's scrotum This seating platform preferably includes appropriately—positioned turning signals, brake lights, and reflective lights. This plurality of signals—turning signals and brake lights—is preferably connected to and powered by a plurality of batteries or solar cells.

Other variations and modifications will, of course, become apparent from a consideration of the structures and techniques hereinbefore described and depicted. Accordingly, it should be clearly understood that the present invention is not intended to be limited by the particular features and structures hereinbefore described and depicted in the accompanying drawings, but that the concept of the present invention is to be measured by the underlying spirit of the invention disclosed herein as manifest by the scope of the appended claims.

What is claimed is:

1. A bicycle seat for accommodating a bicycle rider, said bicycle seat comprising:

a broad, substantially round seating platform having a pair of concave depressions disposed on opposite sides of a longitudinal axis and configured to conform to said bicycle rider's buttocks and ischial bones, for enabling said bicycle rider to sustain stability while pedaling thereon, promoting effective hip support and control of said bicycle's orientation;

said pair of depressions separated by a ridge disposed longitudinally therebetween;

each depression of said pair of depressions exteriorly bounded and retained by a lateral edge of each of a pair of lateral edges, with each said lateral edge configured to slope upwardly from front to back of said seating platform, and disposed atop said seating platform surface at a front end thereof and further disposed atop an opposite rear surface configured to be raised at its rear end relative to said front end;

said ridge elevated relative to said pair of lateral edges and contiguous with each said lateral edge, and having a convex configuration; and a third depression, smaller than each depression of said pair of depressions, and disposed contiguously thereof and further disposed medially of said ridge and said front end, and configured to completely enclose said bicycle rider's genitals, for minimizing pressure thereupon and said ischial bones.

2. The bicycle seat recited in claim 1, wherein an external wall of said seating platform further comprises a plurality of brake lights operated by said bicycle rider.

3. The bicycle seat recited in claim 1, wherein said external wall of said seating platform further comprises a plurality of turn signal lights operated by said bicycle rider.

4. The bicycle seat recited in claim 1, wherein said external wall of said seating platform further comprises a plurality of reflective lights.

* * * * *